Feb. 13, 1951     H. A. SHABAKER     2,541,109
METHOD AND APPARATUS FOR PREPARATION OF CONTACT MASSES
Filed Aug. 19, 1944
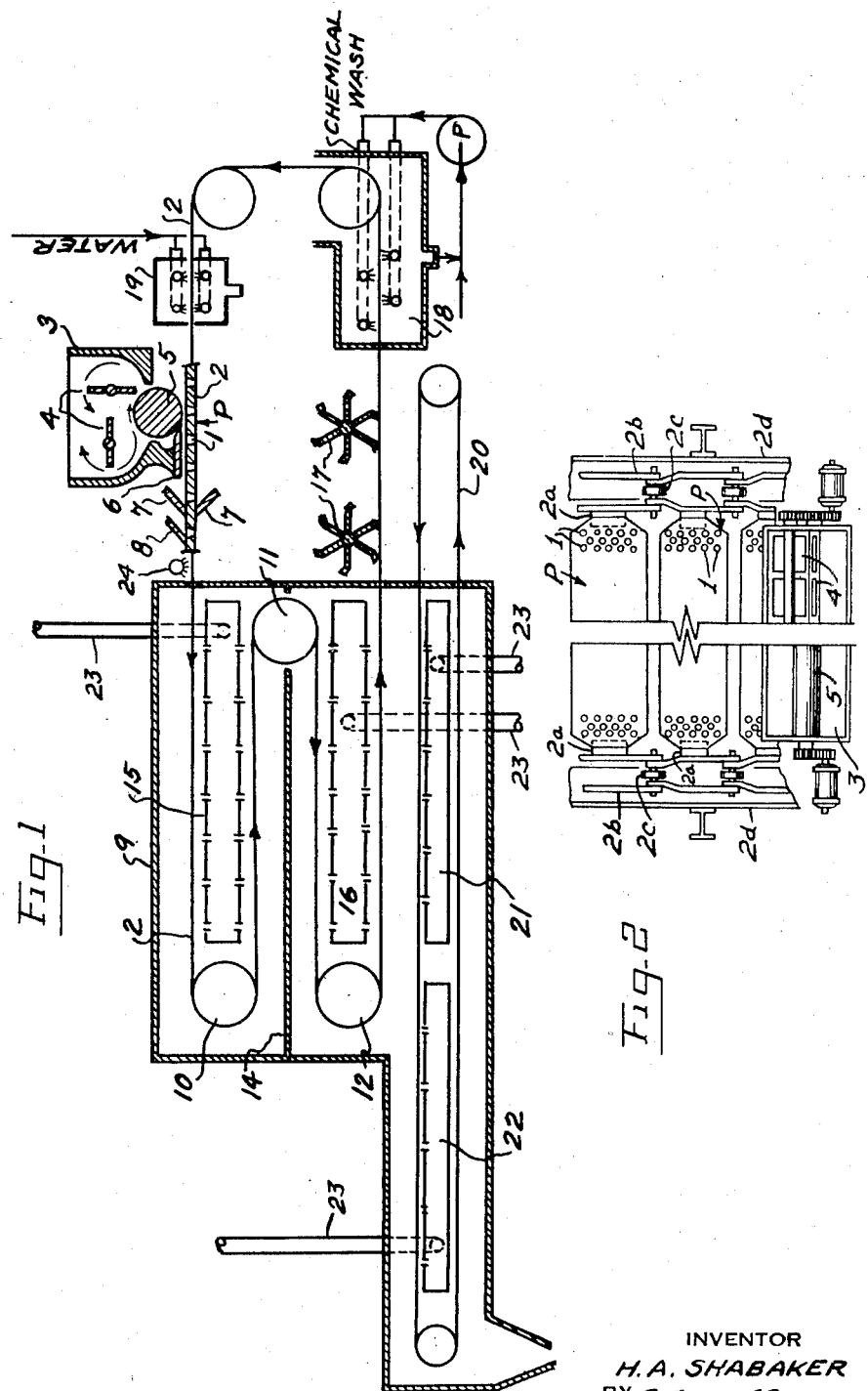
INVENTOR
H. A. SHABAKER
BY
ATTORNEY Patented Feb. 13, 1951

2,541,109

UNITED STATES PATENT OFFICE 2,541,109

METHOD AND APPARATUS FOR PREPARATION OF CONTACT MASSES

Hubert A. Shabaker, Media, Pa., assignor to Houdry Process Corporation, Wilmington, Del., a corporation of Delaware Application August 19, 1944, Serial No. 550,257

18 Claims. (Cl. 25—1)

The present application is in part a continuation of my application, Ser. No. 437,321, filed April 2, 1942, which has become Patent 2,413,735, which in turn is in part a continuation of my application, Ser. No. 349,794, filed August 2, 1940 and copending therewith which has become abandoned.

The present invention relates to processes for the manufacture of hard strong molded units of ceramic or ceramic-like material. It is particularly concerned with the production of molded contact masses, such as catalysts, from wet molding mixtures which are workable and which develop strength and rigidity upon drying.

Primary objects of the present invention are to provide economical methods for the production of strong molded pieces; to provide such methods for producing molded units which do not have a plane of weakness at a mid-point thereof; and to provide improved methods for the manufacture of contact materials such as catalysts. Other objects and advantages will be apparent as the description proceeds.

In accordance with a specific preferred form of the present invention a heterogeneous paste composed of a liquid and a powder substantially insoluble therein, such as a dried silicious plural gel, for example, silica-alumina, silica-zirconia, silica-alumina-zirconia, silica-urania, silica-zirconium phosphate, and the like, is dried in molds exposing opposite ends of the molded unit. The molded unit is dried from one of said ends only. Such drying is preferably effected by impingement type of drying, warm air being blown at one end of the molded unit. Evaporation from the other end of the unit is relatively immaterial. If desired, further quantities of the liquid may be sprayed upon the end of the molded unit from which evaporation is prevented. The units preferably are dried initially in the molds with low temperature air and then, following removal of the units from the molds, they are dried with air at a higher temperature.

By manufacture of molded units as above indicated, evaporation occurs substantially only from one surface of the units. Accordingly, hardening by drying is progressive from that surface of the unit from which drying occurs through the unit, so that, in the final stages of drying in the molds, moisture migrates from the parts of the unit distant from the drying surface to the drying surface from which it is evaporated.

A form of molding and drying apparatus for carrying out the present invention is disclosed by the accompanying drawing on which:

Fig. 1 is a schematic longitudinal section through the apparatus; and

Fig. 2 is a plan view showing a part of the apparatus illustrated in Fig. 1.

A series of plates P having openings 1 therethrough is secured together to form an endless belt 2 of mold plates. As shown in Fig. 2, opposite ends of each plate P are secured, respectively, to supports 2a carried by transversely alined links of the respective sprocket chains 2b. Each sprocket chain 2b carries rollers 2c and each set of these rollers, rides, respectively, on parallel tracks 2d which are supported in any suitable manner. The openings 1 in the mold plates extend completely therethrough and preferably, as shown, are tapered to facilitate the removal of the molded units therefrom. Paste is supplied to the mold plates of belt 2 by a hopper 3 positioned thereabove. The hopper is provided with kneading arms 4 which are synchronously driven to maintain the paste as a blowable mixture. In the lower end of the hopper, adjacent the mold plates, there is positioned a driven feed roll or cylinder 5. The roll 5, being driven clockwise as shown in Fig. 1, carries a sheet of the paste from the lower portion of the hopper down onto the mold plates. A knife 6 is positioned close to the roll 5 and to the mold plates to strip the sheet of paste off of the roll and position it on the plates. A pair of wiper blades 7 is positioned above and below the plates in the direction of movement from the roll 5. The upper wiper blade 7 wipes the paste into the mold openings, while the lower blade 7 levels the lower end of the molded unit. After passage from the blades 7 the molded units will tend to drop slightly in the mold openings whereby the lower end of each molded unit exists as a protuberance extending downwardly from the lower surface of the upper span of the belt 2. To assist the action of gravity in forming protuberances, a blade 8 may be positioned above the belt 2 to press against the upper ends of the molded units.

The belt 2, having its openings then loaded with the paste, passes into and through impingement drier 9. This drier is so arranged as to blow air or other drying gas against one side only of the belt 2. As shown, the belt 2 passes from its point of inlet into drier 9, the hereinbefore described sprocket chains 2b passing around sprocket wheels 10, 11 and 12. With wheels 10 and 12 at the end of the drier away from the point of inlet and exit of the belt and the wheel 11 at said end, the belt 2 makes two complete passes through the drier. The drier 9 is divided into two compartments by a partition 14 substantially on the level of wheel 11 and between the two passes of belt 2. A manifold 15 is positioned between the two runs of the belt in the upper compartment, and is provided with nozzles directed both upwardly and downwardly to impinge the drying gas against a single surface of the belt. A similar manifold 16 is positioned between the two runs of the belt in the lower portion of the drier 9. Both manifolds blow against one side only of the belt.

The molded units following drying, as described, will have arrived at a substantially rigid state. The belt then passes out of the drier and under beaters 17 which, by engaging the protuberances, knock the molded units out of the openings in the belt. The belt then receives a chemical washing at 18 and a water washing at 19, following which it returns to a position below the hopper 3 for repetition of the described process.

The molded units discharged from the belt 2 drop onto belt 20. This belt 20 is likewise provided with openings therethrough and is preferably in the form of a screen of mesh sufficiently small to support the molded units. The belt 20 passes into the drier and over a manifold 21 provided with nozzles upwardly directed to impinge air or other drying gas against the surfaces of the molded units. If desired, an additional manifold 22 similar to the manifold 21 may be employed for further drying operations. The dried molded units are then discharged from the belt 20 for use or further treatment.

In any suitable manner, streams of air having desired temperature may be admitted to the manifolds 15, 16, 21 and 22 in order to dry the molded units. To this end, if desired, conduits 23 may be connected to the respective manifolds, each of these conduits leading to a source of air having pressure suitable for the intended purpose.

The final drying effected with the material on the belt 20 may be effected with air without employing impingement.

The impingement drying is so rapid that any drying from the end of the molded unit not subjected to impingement of drying air is relatively negligible. The paste in the portion of the molded units accordingly remains in flowable condition until dehydration and setting resulting from evaporation from the end subjected to impingement drying has progressed through the unit to the opposite end. By drying in this manner progressive development of hardness and cohesion through each molded unit is effected. Sufficient water may be included in the mixture to effect this result. If desired, water may be sprayed on those ends of the units which are not engaged by the drying air and, to this end, one or more perforated conduits 24 may be disposed above the first course of the belt 2 beyond the blade 8, Fig. 1.

In one plant in which drying operations are conducted, as described, air temperatures as follows are employed: the air from manifold 15 is maintained at 125° F., air from manifold 16 and 21 is maintained at 140° F., air from manifold 22 is maintained at 300° F.

Plant operation in accordance with the present invention has shown an improvement of as much as 100% in the hardness of molded units when dried from one end only as compared with the hardness of units dried in the same drier, but arranged for drying from both ends.

I claim as my invention:

1. Apparatus for producing molded contact masses from workable materials which harden upon drying comprising, in combination, a series of plates having perforations extending transversely therethrough for receiving and molding such material, means for loading said material into said perforations, means providing a drying chamber, means for moving said plates successively into loading position with respect to said first named means and into and through said chamber, and means within said chamber arranged and adapted to impinge hot gases against one side only of said plates during at least a portion of their travel therethrough, the other side of said plates being engaged by the gases in the ambient space.

2. In apparatus for molding, the combination comprising a carrier having a series of perforations extending therethrough, means for introducing moldable material into said perforations, whereby units are molded having two ends of each exposed, one on each side of said carrier, and a drying chamber into which said carrier passes arranged to effect drying of the units in said perforations from only one of said two exposed ends, whereby strong dried molded units are produced.

3. In drying a molded unit of wet workable material which hardens upon drying, the steps of directing drying gases at temperature substantially above room temperature into engagement with an undivided entire end surface of said unit to produce rapid evaporation therefrom, and adding water to said unit in quantity sufficient to retard evaporation and setting in the portion of the unit opposite said end surface until dehydration and setting resulting from said rapid evaporation has progressed through the unit.

4. In producing a hard strong body from a unit of paste disposed in a mold having opposed openings, at least one of which exposes an entire end face of said unit, and containing water and synthetic inorganic gel, the process which comprises directing drying gases at temperature substantially above room temperature into engagement with said exposed face of said unit adjacent one of said openings at a velocity sufficient to effect rapid evaporation therefrom, and adding water through the opening opposed thereto to prevent substantial surface evaporation from the paste adjacent said last named opening.

5. In producing hard strong molded products valuable for use as contact masses from molded units of wet workable material, the process which comprises directing drying gases at temperature substantially above room temperature into engagement with undivided entire end surfaces of the respective units while in the mold in which the units are formed to effect rapid evaporation from said surfaces and to develop hardness progressively therefrom through the respective units while simultaneously maintaining at surfaces of the respective units which are opposed to said undivided end surfaces an atmosphere effective to retard evaporation.

6. In the art of producing a hard molded contact mass in a plate-like mold comprising a transverse passage in which is disposed a body of liquid-containing paste having exposed faces at the respective opposite sides of said mold at least one of which comprises an entire undivided end surface, the steps which comprise heating gases to cause the temperature thereof to substantially exceed room temperature, directing the heated gases into engagement with said undivided end surface in quantities sufficient to effect rapid evaporation therefrom, and simultaneously retarding evaporation from the other exposed face of the body of paste so as to maintain molded material adjacent thereto in workable condition until evaporation from said first named exposed face has progressed through said body of paste to provide progressive development of hardness and cohesion therethrough.

7. In producing hard strong molded units from a mixture containing precipitated silica and water wherein the mixture shrinks and hardens upon drying, the process of drying a molded unit to develop strength and rigidity therein which comprises heating gases to cause the temperature thereof to substantially exceed room temperature, directing the heated gases into engagement with one exposed face comprising an undivided entire end of the unit while in its supporting mold to effect evaporation of water from said face and to produce drying and shrinkage of said unit progressively from said face toward its opposite exposed face, and simultaneously maintaining sufficient water in the molded material adjacent said opposite exposed face to maintain said material of flowable consistency until shrunk and hardened by the aforesaid progressive drying.

8. Process according to claim 7 wherein the necessary quantity of water is included in the mixture prior to drying.

9. Process according to claim 7 wherein the necessary quantity of water is added to the molded unit.

10. Process according to claim 7 wherein the mixture is a thixotropic mixture of water and precipitated silica and alumina.

11. In the art of producing a rigid molded product in a plate-like mold comprising a transverse passage in which is disposed a body of liquid-containing paste having exposed surfaces at the respective opposite sides of said mold the peripheries of which are coincident with the ends of said passage, the steps which comprise passing the mold through a drying zone while contacting one exposed surface of the body of paste with ambient gases insufficient to effect rapid evaporation therefrom, and directing drying gases at temperature substantially above room temperature and in quantities sufficient to effect rapid evaporation of said liquid into engagement with said body of paste at its other exposed surface to thereby progressively heat the paste in a direction extending inwardly from said last named exposed surface with consequent relatively rapid withdrawal of liquid from the paste along a path extending in reverse direction, said other exposed surface of the body of paste, during the entire period that elapses while the mold is passing through the drying zone, being engaged solely by said drying gases with the result that, as the pre-existing body of paste leaves the drying zone, sufficient liquid has been removed therefrom to cause it to be a rigid molded product as specified above.

12. The process of claim 11 wherein the drying zone comprises a compartment through which the mold passes in reverse directions while the heated gases are directed into engagement with said body of paste as specified.

13. The process of claim 11 wherein the drying zone comprises separate compartments through which the mold passes in succession.

14. The process of claim 11 wherein the drying zone comprises separate compartments through each of which the mold passes in reverse directions while the heated gases are directed into engagement with said body of paste as specified.

15. In the art of producing a rigid molded product in a plate-like mold comprising a transverse passage in which is disposed a body of liquid-containing paste having exposed surfaces at the respective opposite sides of said mold the peripheries of which are coincident with the ends of said passage, the steps which comprise passing the mold through a drying zone while contacting one exposed surface of the body of paste with ambient gases insufficient to effect rapid evaporation therefrom, heating gases to cause the temperature thereof to substantially exceed room temperature, and, during movement of the mold through said drying zone, causing streams of the heated gases to successively engage said body of paste at its other exposed surface to thereby progressively heat the paste in a direction extending inwardly from said last named exposed surface with consequent withdrawal of liquid from the paste along a path extending in reverse direction, said other exposed surface of the body paste, during the entire period that elapses while the mold is passing through the drying zone, being engaged solely by said heated gases with the result that, as the pre-existing body of paste leaves the drying zone, sufficient liquid has been removed therefrom to cause it to be a rigid molded product as specified above.

16. In the art of producing a rigid molded product in a plate-like mold comprising a transverse passage in which is disposed a body of liquid-containing paste having exposed surfaces at the respective opposite sides of said mold, the steps which comprise passing the mold through a drying zone containing substantially static gases which engage one side of the mold and one exposed surface of the body of paste, heating gases to cause the temperature thereof to substantially exceed room temperature, and, during movement of the mold through said drying zone, causing streams of the heated gases to successively engage said body of paste at its other exposed surface to thereby progressively heat the paste in a direction extending inwardly from said last named exposed surface with consequent withdrawal of liquid from the paste along a path extending in reverse direction, said other exposed surface of the body of paste, during the entire period that elapses while the mold is passing through the drying zone, being engaged solely by said heated gases with the result that, as the pre-existing body of paste leaves the drying zone, sufficient liquid has been removed therefrom to cause it to be a rigid molded product as specified above.

17. In the art of producing a rigid molded product in a plate-like mold comprising a transverse passage in which is disposed a body of liquid-containing paste having exposed surfaces at the respective opposite sides of said mold, the steps which comprise passing the mold through a drying zone containing substantially static gases which engage one side of the mold and one exposed surface of the body of paste, heating gases to cause the temperature thereof to substantially exceed room temperature, during movement of the mold through said drying zone, causing streams of the heated gases to successively engage said body of paste at its other exposed surface to thereby progressively heat the paste in a direction extending inwardly from said last named exposed surface with consequent withdrawal of liquid from the paste along a path extending in reverse direction, said other exposed surface of the body of paste, during the entire period that elapses while the mold is passing through the drying zone, being engaged solely by said heated gases with the result that, as the pre-existing body of paste leaves the drying zone, sufficient liquid has been removed therefrom to cause it to be a rigid molded product as specified above, removing the rigid molded product from the mold, and thereafter subjecting said rigid molded product to a further drying operation.

18. The process of claim 17 wherein the last named drying operation is effected under a temperature condition which is higher than that which exists in said drying zone.

HUBERT A. SHABAKER.

REFERENCES CITED

The following references are of record in the file of this patent:

UNITED STATES PATENTS

| Number | Name | Date |
|---|---|---|
| 190,634 | Smith | May 8, 1877 |
| 826,147 | Croxton | July 17, 1906 |
| 1,106,087 | DuPont | Aug. 4, 1914 |
| 1,157,658 | Mashek | Oct. 19, 1915 |
| 1,209,696 | Gaumont | Dec. 26, 1916 |
| 1,441,091 | Howson | Jan. 2, 1923 |
| 1,453,746 | Carey | May 1, 1923 |
| 1,453,747 | Carey | May 1, 1923 |
| 1,513,932 | Rhoads | Nov. 5, 1924 |
| 1,572,849 | Secord | Feb. 9, 1926 |
| 1,629,151 | Cushwa | May 17, 1926 |
| 1,641,922 | Davis | Sept. 6, 1927 |
| 1,731,006 | Goodwin et al. | Oct. 8, 1929 |
| 1,751,430 | Thomson | Mar. 18, 1930 |
| 1,777,972 | Hurxthal | Oct. 7, 1930 |
| 1,852,462 | Kjellgren | Apr. 5, 1932 |
| 1,896,884 | Cooper et al. | Feb. 7, 1933 |
| 2,053,996 | Jones | Sept. 8, 1936 |
| 2,170,445 | Colbert | Aug. 22, 1939 |
| 2,185,087 | Jones | Dec. 26, 1939 |
| 2,186,160 | Anderson | Jan. 9, 1940 |
| 2,385,962 | Barnell | Oct. 2, 1945 |
| 2,413,735 | Shabaker | Jan. 7, 1947 |

FOREIGN PATENTS

| Number | Country | Date |
|---|---|---|
| 131,502 | Great Britain | Aug. 28, 1919 |